June 23, 1953  W. ROBERTSON ET AL  2,643,363
PANEL BOARD NEUTRAL BAR
Original Filed Aug. 6, 1948  2 Sheets-Sheet 1

INVENTORS
William Robertson
and Louis W. Higgins
BY
Daniel G. Cullen
Attorney

INVENTORS
William Robertson
and Louis W. Higgins
BY Daniel G. Cullen
Attorney

Patented June 23, 1953

2,643,363

UNITED STATES PATENT OFFICE 2,643,363

PANEL BOARD NEUTRAL BAR

William Robertson and Louis W. Higgins, Detroit, Mich., assignors to BullDog Electric Products Company, Detroit, Mich., a corporation of West Virginia Original application August 6, 1948, Serial No. 42,974. Divided and this application April 27, 1949, Serial No. 89,902

1 Claim. (Cl. 339—136)

This application relates to panel boards and particularly to neutral constructions and mounting plates of panel boards, and is a divisional of the parent application, Ser. No. 42,974, filed August 6, 1948, now Pat. No. 2,511,995, issued June 20, 1950.

It is a particular object of the present invention to provide a neutral construction for panel boards characterized by the provision of a housing around a neutral bar and by the provision of a suitable grounding and sealing means around a stud which clamps the neutral bar and housing in place and securely with respect to a panel board.

It is a still further object to provide a novel housed neutral bar construction.

It is a still further object to provide a construction employing a single stud for securing a housing, a neutral bar, and a mounting plate for the panel board units in place.

Still further objects of the present invention will be understood by those skilled in the art upon reference to the appended drawings.

Figure 1:
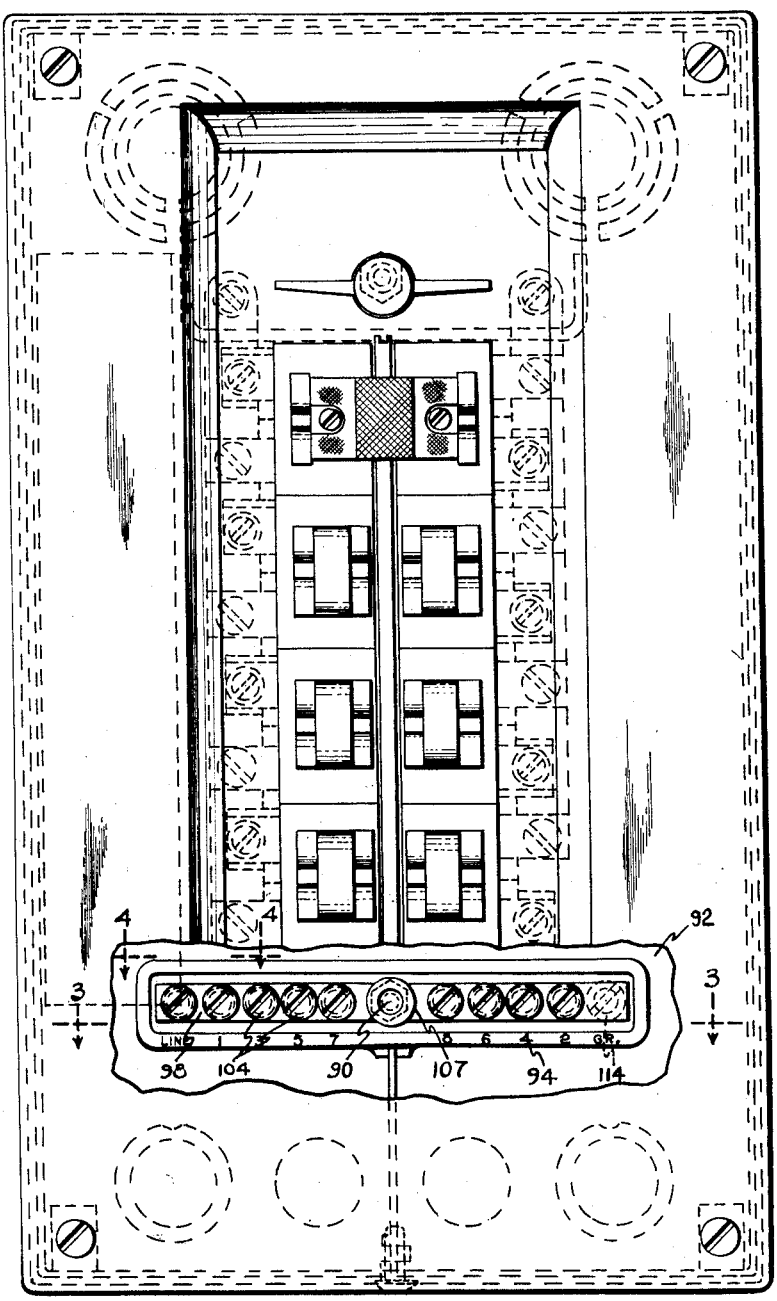
Fig. 1 is a front view of one form of panel board with a housed neutral construction shown at the cut away lower part of the figure.
Figure 3:
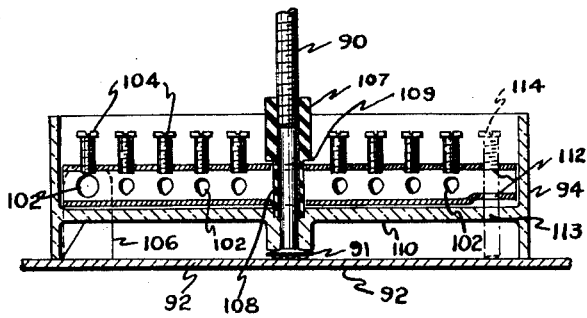
Figure 4:
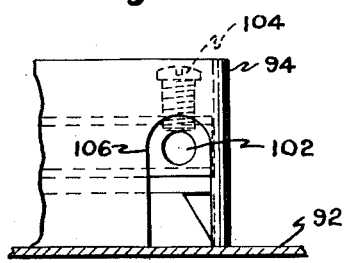
Figure 2:
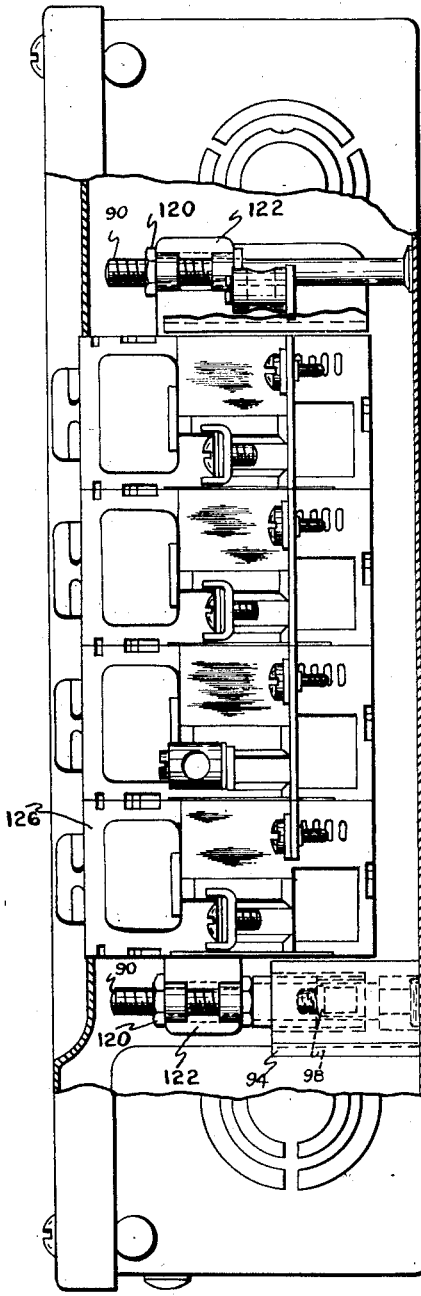
Fig. 2 is a right side view with parts cut away for purposes of clarity.

Figs. 3 and 4 are section views as if on lines 3—3 and 4—4 of Fig. 1.

Figure 5:
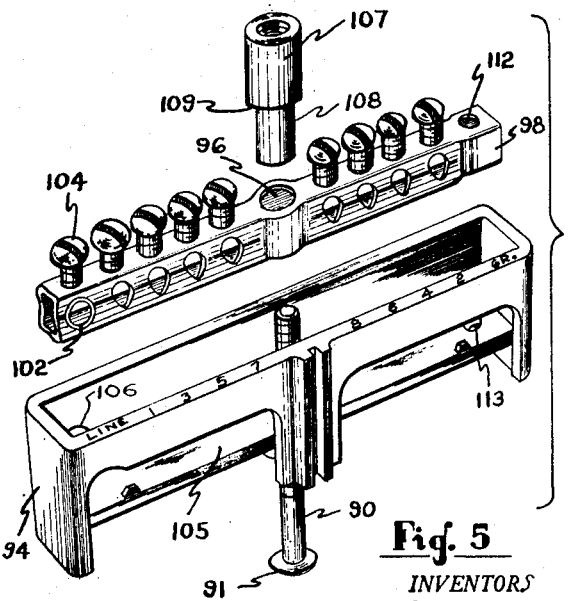

Fig. 5 is a perspective exploded view of the housed neutral construction of Figs. 1-4.

Figs. 1-5 show a panelboard having studs 90 whose ends 91 are secured, as by welding, to the back 92 of the panelboard box. The lower stud 90 passes through an insulation housing 94 and through a center hole 96 of a neutral bar or tube 98. The latter has numerous pairs of transversely alined holes 102 and numerous binding screws 104 for the branch wire terminals.

A large opening 105 in one side of the housing 94 enables the numerous branch wire terminals to enter holes 102 of the bar 98. The opposite side of the housing has a large hole 106 to permit a wire terminal to enter bar 98 from the opposite side as well, but only, as shown, at the end of the bar.

An insulating nut 107 passes down over the upper end of the stud 90 and threads down onto it. This nut has a reduced portion 108, defined by a shoulder 109, which passes through the neutral bar 98 to insulate the latter from the stud 90 and thus to hold the neutral bar 98 and the housing 94 in assembly, shoulder 109 sealing to and engaging the bar 98. Sliding lateral clearance, however, is provided between the portion 108 and the hole 96 of the neutral bar. The lower end of the nut 107 engages and seals to the floor or bottom 110 of the housing 94 to form a tight seal and complete insulation barrier between the stud 90 and the neutral bar 98. The sliding clearance between the portion 108 of the nut 107 and the hole 96 of the neutral bar 98 enables the latter to float on the stud 90, but the barrier between the stud and the neutral bar is complete and sealed by the tight seal at the lower end of the nut 107, and that provided by the engagement of shoulder 109 with bar 98.

The end ones of the alined transverse holes 102 are slightly enlarged as indicated at the left of the neutral bar to receive and bind the neutral wire terminal which may enter thru either opposite side openings 105—106. The other binding posts and their holes 102 bind and receive the branch wire terminals which enter thru opening 105.

At the right end of the neutral bar is a large tapped hole 112 alined with a clear hole 113 in the floor 110 of housing 94 and through which may be passed a screw 114 to engage the back of the metal box for grounding the neutral bar to the back of the box, as desired.

Above the nut 107 projects an end of the stud 90 which may be utilized to clamp, as by means of a nut 120, one end of a mounting plate or backbone 122 to which are secured branch circuit control units 126 whereby the same stud that mounts the neutral bar 98 and its housing 94 also helps mount the backbone 122 and the branch circuit control units 126. (See studs 18 of Patent No. 2,428,322 of September 30, 1947.)

The other end of plate 122 is mounted by identical means 90—91—120, as shown, there, however, being no housing 94, neutral bar 98, or nut 107 on the upper stud 90.

Now having described the panelboard herein disclosed reference should be had to the claim which follows for a determination of the inventions hereof.

We claim:

In a panelboard mounted within a box, a housing within said box and of insulating material, a neutral bar disposed within said housing and insulated thereby from said box, a stud extending from the rear wall of said box and passing through an opening in said housing and said neutral bar, the opening in said neutral bar being of a diameter greater than that of said stud, said stud having length sufficient both to pass through said neutral bar and said housing and also to pass through and thus secure a mounting plate for individual panel units, a shouldered insulating nut fitting over said stud, the depending reduced portion of such nut extending into the opening of said housing between the inside diameter of said opening and the outside diameter of said stud and downwardly below the inside floor of said housing so as to seal off and insulate said neutral bar from said stud, the shoulder of said insulating nut securing said neutral bar within said housing and also securing said neutral bar and said housing in like manner rigidly against the rear wall of said box.

WILLIAM ROBERTSON.
LOUIS W. HIGGINS.

References Cited in the file of this patent

UNITED STATES PATENTS

| Number | Name | Date |
|---|---|---|
| 789,433 | King | May 9, 1905 |
| 1,930,028 | Adam | Oct. 10, 1933 |
| 1,992,056 | Colbie | Feb. 19, 1935 |
| 2,145,041 | Childers | Jan. 24, 1939 |
| 2,431,999 | Engelhardt | Dec. 2, 1947 |
| 2,438,025 | Taliaferro | Mar. 16, 1948 |

FOREIGN PATENTS

| Number | Country | Date |
|---|---|---|
| 145,356 | England | July 2, 1920 |
| 216,926 | England | June 4, 1924 |